(12) United States Patent
Ross et al.

(10) Patent No.: US 6,462,736 B1
(45) Date of Patent: *Oct. 8, 2002

(54) SYSTEM AND METHOD PROVIDING A THREE-DIMENSIONAL DISPLAY OF VALUES RELATIVE TO COMPARISON VALUES

(75) Inventors: G. Terry Ross, Austin, TX (US); Gregg L. Sporar, Austin, TX (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/494,162

(22) Filed: Jan. 25, 2000

(51) Int. Cl.⁷ .................................................. G06F 3/14
(52) U.S. Cl. ...................... 345/419; 345/619; 345/584; 345/422; 345/426; 345/848
(58) Field of Search ............................... 345/848, 619, 345/419, 581, 422, 426; 705/1, 22, 28

(56) References Cited

U.S. PATENT DOCUMENTS

| | | | | |
|---|---|---|---|---|
| 3,703,630 A | * | 11/1972 | Gelder | 313/510 |
| 3,725,650 A | * | 4/1973 | Gelder | 700/108 |
| 5,491,779 A | * | 2/1996 | Bezjian | 345/419 |
| 5,664,077 A | * | 9/1997 | Kubo | 345/419 |
| 5,751,931 A | * | 5/1998 | Cox et al. | 345/419 |
| 6,370,509 B1 | * | 4/2002 | Ross et al. | 345/419 |
| 6,377,257 B1 | * | 4/2002 | Borrel et al. | 345/419 |

* cited by examiner

Primary Examiner—Crescelle N. Dela Torre
Assistant Examiner—Thomas T. Nguyen
(74) Attorney, Agent, or Firm—Baker Botts L.L.P.

(57) ABSTRACT

A computer-implemented system (10) providing a three-dimensional display (30) includes at least one model (12) of an environment and at least one engine (14) operable to generate the display (30) using information associated with the model (12). The display (30) includes a graphical body (38) conveying a first value corresponding to a value of a variable, the variable value being identified according to an axis. The first value is conveyed according to a height (40) of the graphical body (38) at the variable value. The graphical body (38) conveys a second value corresponding to the variable value, the second value being conveyed according to a depth (42) of the graphical body (38) at the variable value. The graphical body (38) also conveys at least a comparison of the first value to a first comparison value according to an indicia (44) that is visible on the graphical body (38) at the variable value, the indicia (44) specified according to a predetermined scale.

53 Claims, 5 Drawing Sheets

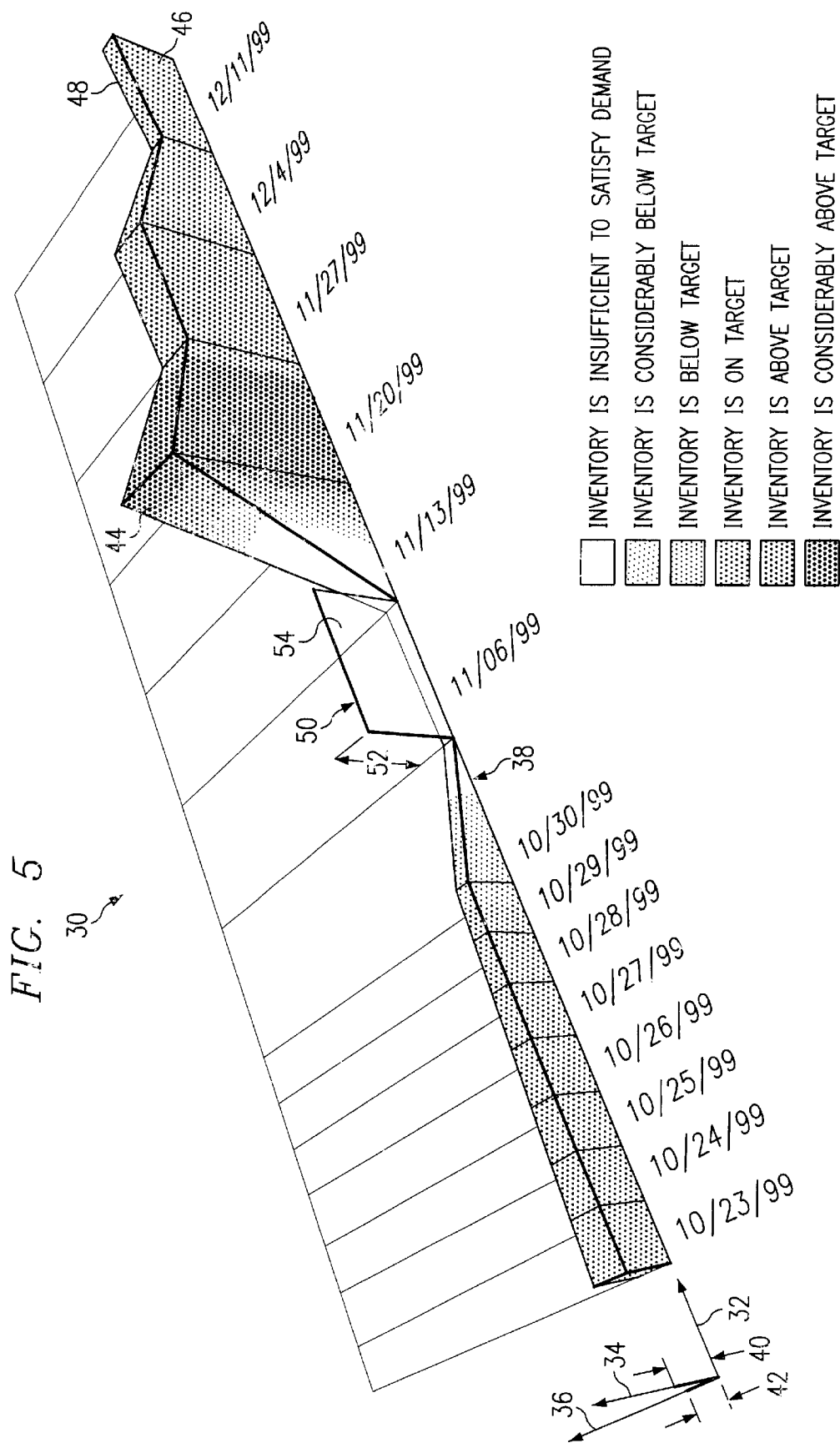

SYSTEM AND METHOD PROVIDING A THREE-DIMENSIONAL DISPLAY OF VALUES RELATIVE TO COMPARISON VALUES

CROSS-REFERENCE TO RELATED APPLICATIONS

This Application is related to U.S. application Ser. No. 09/282,912 for a "Three-Dimensional Production Schedule Display for Computer-Implemented Production Management System," filed Mar. 31, 1999 now U.S. Pat. No. 6,370,509 by G. Terry Ross and Gregg L. Sporar.

TECHNICAL FIELD OF THE INVENTION

This invention relates generally to the field of computer-implemented visual displays and, more particularly, to a system and method providing a three-dimensional display of values relative to comparison values.

BACKGROUND OF THE INVENTION

Computer-implemented systems associated with manufacturing, transportation, supply chain, enterprise, and other resource planning operations are widely available. In general, such systems model appropriate manufacturing, transportation, supply chain, enterprise, or other environments and provide information to the users of those systems according to particular needs. For example, in a supply chain planning environment in which inventory levels are pertinent, such systems may provide certain inventory level information to users visually through a graphical user interface (GUI). By interpreting the information presented to them visually, users are able to make decisions affecting inventory levels and associated supply chain planning operations.

As the economy becomes more distributed and planning environments become increasingly complex, the need to provide manufacturing, transportation, supply chain, enterprise, or other planning information to users has become increasingly important. The more readily able users are to interpret and act upon the information presented to them, the more associated organizations are able to benefit from the knowledge, skills, and expertise of these users. However, previous systems for displaying such planning information are often inadequate to meet the needs of many users and organizations, particularly in complex environments associated with manufacturing, transportation, supply chain, enterprise, and other planning operations.

SUMMARY OF THE INVENTION

In accordance with the present invention, a computer-implemented system and method providing a three-dimensional display of values relative to comparison values reduces or eliminates problems and disadvantages associated with previous systems for displaying information.

In one embodiment of the present invention, a computer-implemented system providing a three-dimensional display includes at least one model of an environment and at least one engine that is able to generate the display using information associated with the model. The display includes a graphical body conveying a first value corresponding to a value of a variable, the variable value being identified according to an axis. The first value is conveyed according to a height of the graphical body at the variable value. The graphical body conveys a second value corresponding to the variable value, the second value being conveyed according to a depth of the graphical body at the variable value. The graphical body further conveys at least a comparison of the first value to a first comparison value according to an indicia that is visible on the graphical body at the variable value, the indicia being specified according to a predetermined scale. In more particular embodiments, the variable may be time, the environment may be a supply chain planning environment, the engine may be a planning engine, the first and second values may be inventory levels, and the indicia may be color.

The system and method of the present invention provide a number of important technical advantages. The present invention provides a three-dimensional display of one or more values relative to suitable comparison values in a visually compelling, spatially efficient, and readily comprehensible manner. By viewing a single display according to the present invention, a user in a supply chain planning or other planning environment can readily achieve a comprehensive understanding of a past history, current situation, or future plan as it relates to inventory or any other suitable information. The display depicts the variation in measures of inventory levels (or other values) over time (or other variable), while also conveying information about interactions among the measures of inventory levels (or other values) that is not readily ascertainable from displays usually associated with prior systems. These features contribute to the ability of the system to convey to users a relatively large quantity of information, on a single computer screen and in a visually compelling and more readily comprehensible fashion. Other technical advantages will be readily apparent to those skilled in the art.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

To provide a more complete understanding of the present invention, and further features and advantages thereof, reference is now made to the following description taken in conjunction with the accompanying drawings, in which:

FIG. 5 illustrates an exemplary three-dimensional display of values relative to comparison values including a difference panel, with dot density as an indicia.

DETAILED DESCRIPTION OF THE INVENTION

Figure 1:
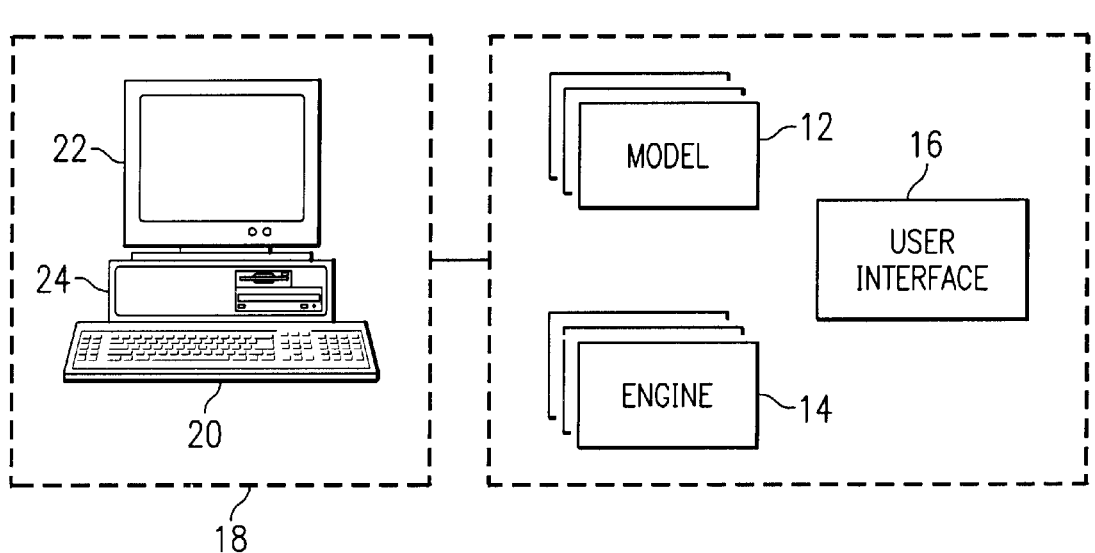
FIG. 1 illustrates an exemplary system for displaying information.

FIG. 1 illustrates an exemplary system 10 providing a three-dimensional display. Although in one embodiment the displayed information may be associated with manufacturing, transportation, supply chain, enterprise, or other appropriate planning operations, the present invention contemplates displaying any appropriate information according to particular needs. For example only, and not by way of limitation, it may be desirable in a supply chain planning environment to display to users the variation of inventory levels over time. According to the present invention, one or more inventory levels, whether they be actually measured, derived from other information, projected, or determined in any other appropriate manner, may be presented in a three-dimensional display relative to one or more target, benchmark, or other comparison inventory levels over one or more selected time intervals. Although the present invention is primarily described in relation to such inventory levels, those skilled in the art will appreciate that the features and advantages of the present invention are equally applicable to a variety of other types of information, and that the present invention encompasses the display of values relative to comparison values in all such contexts.

System 10 includes one or more models 12 of manufacturing, transportation, supply chain, enterprise, or other planning environments, or portions thereof, to which the displayed information is pertinent. One or more engines 14 use one or more suitable models 12 to generate corresponding information to be displayed visually to users of system 10, using graphical user interface (GUI) 16, in the manner described below with reference to FIGS. 2 and 3.

System 10 operates on one or more computers 18, each of which may include a suitable input device 20, such as a keypad, mouse, touch screen, microphone, or other device to input information. An output device 22 conveys three-dimensional displays associated with the operation of system 10 to users according to the present invention. Computer 18 may include suitable fixed or removable storage media, such as magnetic computer disks, CD-ROM, or other suitable media to receive output from and provide input to system 10. Computer 18 may include a processor 24 and associated volatile or non-volatile memory at one or more locations to execute instructions and manipulate information according to the operation of system 10. Although only a single computer 18 is shown, components of system 10 may each operate on separate computers 18 or on one or more shared computers 18 without department from the intended scope of the present invention. Such computers 18 may be distributed across a local area network (LAN), a metropolitan area network (MAN), a wide area network (WAN), a global computer network such as the Internet, or any other suitable communications network, sharing database and other resources as appropriate.

The inventory level of an item at a particular point in time, or over a particular time interval, is typically quantified in terms of a countable number of units of the item. The inventory level often changes over time as supplies add units and demands subtract units. The inventory level, whether it be actually measured, derived from one or more other sources of information, or projected into the future, can be compared to a target, benchmark, or other comparison level. For example only, and not by way of limitation, the comparison inventory level at a particular time, or during a particular time interval, might be the inventory target—that is, the quantity of inventory desired at that time or during that interval. The inventory level of an item may also be quantified in terms of "time supply" (also known as "period of cover"). Time supply measures the length of time that available inventory will last before it is consumed by forecasted demand. For example, an inventory level corresponding to a time supply of 3.5 days implies that the inventory level is sufficient to satisfy demand for the following 3.5 days.

Figure 2:
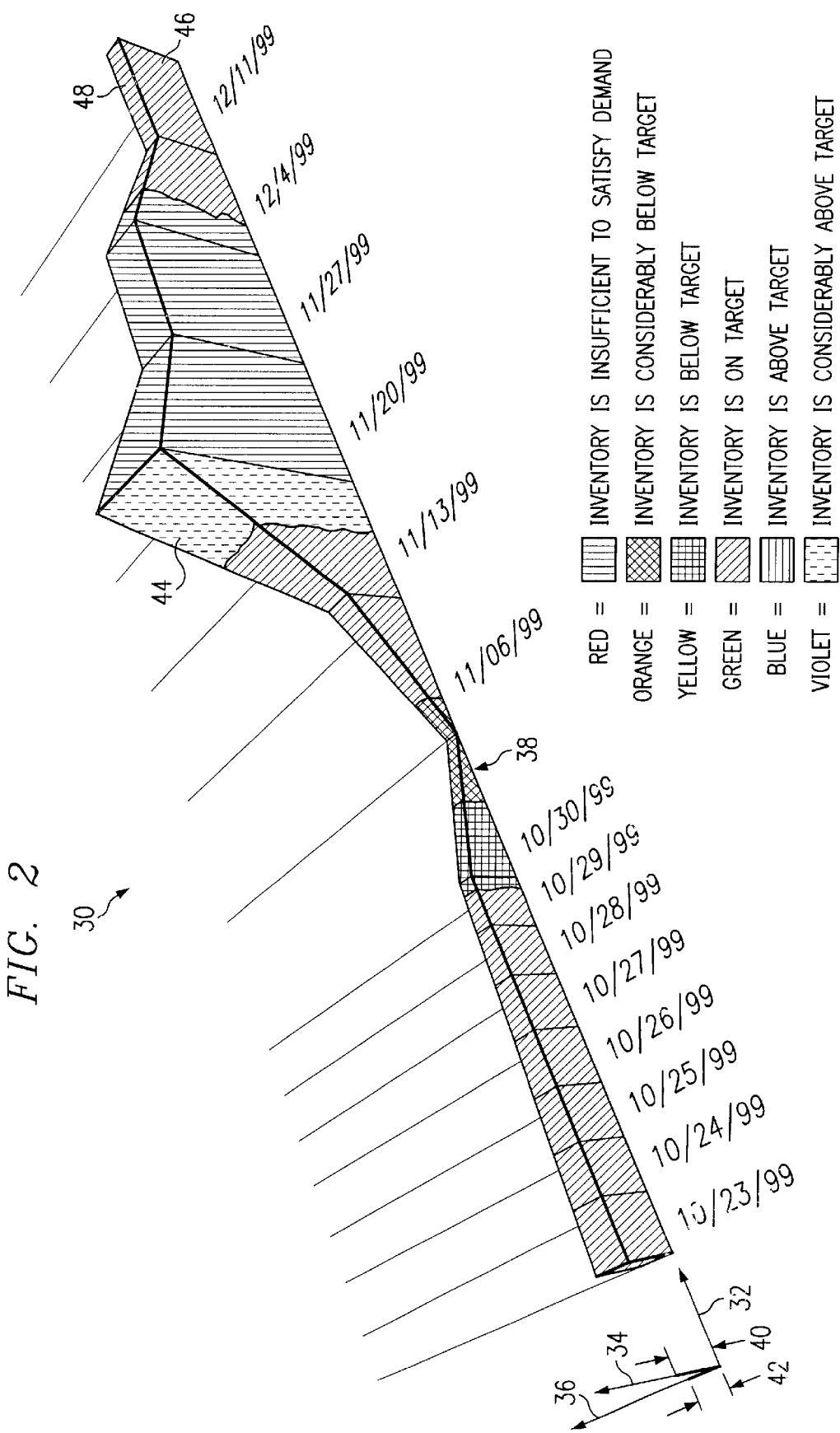
FIG. 2 illustrates an exemplary three-dimensional display of values relative to comparison values, with color as an indicia.

FIG. 2 illustrates an exemplary three-dimensional display 30, presented to users of system 10, of values relative to comparison values. In the particular example illustrated, the values and comparison values are inventory levels within a supply chain planning environment, although as discussed above the present invention contemplates displaying any appropriate information. In one embodiment, display 30 simultaneously depicts inventory levels in terms of countable units at particular times, inventory levels in terms of time supply at these times, and the relation of countable units to at least one set of comparison inventory levels (also in terms of countable units) at these times. In this embodiment, time is represented on horizontal axis 32 (generally from left to right within the page), the inventory level in terms of countable units is depicted on vertical axis 34 (generally out of the page), and the inventory level in terms of time supply is represented on horizontal axis 36 (generally front to back within the page). Display 30 may incorporate other arrangements of axes 32, 34, and 36 without departing from the intended scope of the present invention. Display 30 may depict the relation of time supply to at least one set of comparison inventory levels (also in terms of time supply) instead of or in addition to depicting the relation of countable units to corresponding comparison inventory levels. Although axis 32 is described as a time axis, axis 32 may represent a variable other than time, according to particular needs and the nature of the information being conveyed using display 30.

Graphical body 38 conveys the inventory information according to the present invention. Higher inventory levels in countable units increase the height 40 of body 38 along axis 34. Similarly, higher inventory levels in terms of time supply increase the depth 42 of body 38 along axis 36. Thus, at any point in time, the height 40 and depth 42 of body 38 in three-dimensional display 30 simultaneously convey two measures of inventory level to users of system 10. As discussed more fully below with reference to FIG. 4, inventory shortages or overages in relation to one or more specified target levels may also be conveyed using display 30. According to the present invention, variations in color, shading, dot density, or other indicia 44 characterize inventory levels (in countable units, time supply, or both) relative to corresponding comparison levels, allowing users to readily identify relatively low, relatively high, or otherwise relatively pertinent levels. Thus, system 10 may provide to its users a three-dimensional display 30 that simultaneously depicts up to five measures of inventory level associated with a particular time or time interval—three quantitative (countable units, time supply, and shortage or overage) and two semi-qualitative (countable units and time supply relative to one or more comparison levels for each). As a result, system 10 provides important technical advantages over previous systems for displaying information.

In the particular example illustrated in FIG. 2, variations in color indicate how the inventory levels compare over time to predefined target levels according to the following semi-qualitative scale:

| | |
|---|---|
| Red | Inventory insufficient to satisfy demand |
| Orange | Inventory considerably below target |
| Yellow | Inventory below target |
| Green | Inventory on target |
| Blue | Inventory above target |
| Purple | Inventory considerably above target |

Those skilled in the art will appreciate that other appropriate color scales may be used. Although body 38 is shown being substantially continuous between time intervals, the present invention contemplates body 38 being in the form of multiple spikes or other non-continuous portions, each associated with a particular time or sub-interval. In one embodiment, where body 38 is substantially continuous between two times, colors of body 38 may transition in any suitable manner over the interval between the times to emphasize changes taking place in the inventory level relative to the comparison level over that interval. Instead of or in addition to such smooth transitions, body 38 and its associated indicia 44 may have steps or transitions that are not smooth, as appropriate for the information being displayed and particular needs.

Additionally, variations in shading, dot density, or other indicia 44 according to an appropriate scale may be used to convey this information, instead of or in addition to color. For example, and not by way of limitation, shading may be employed according to the following semi-qualitative scale:

| | |
|---|---|
| White | Inventory insufficient to satisfy demand |
| Very light | Inventory considerably below target |
| Light | Inventory below target |
| Medium | Inventory on target |
| Dark | Inventory above target |
| Very dark | Inventory considerably above target |

Similarly, for example only and not by way of limitation, dot density may be employed according to the following semi-qualitative scale:

| | |
|---|---|
| None | Inventory insufficient to satisfy demand |
| Very light | Inventory considerably below target |
| Light | Inventory below target |
| Medium | Inventory on target |
| Heavy | Inventory above target |
| Very heavy | Inventory considerably above target |

Figure 3:
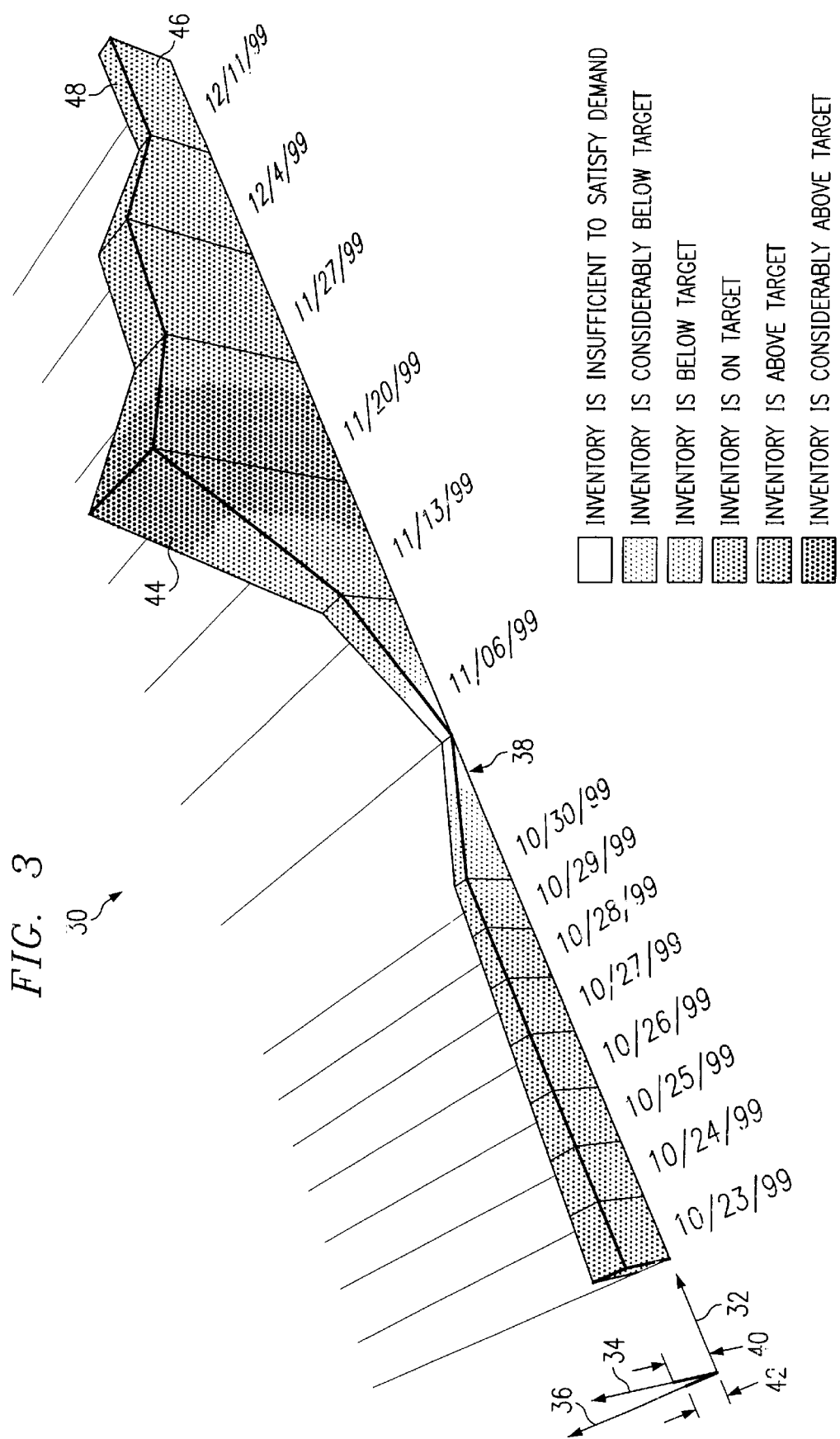
FIG. 3 illustrates an exemplary three-dimensional display of values relative to comparison values, with dot density as an indicia.

Use of dot density as indicia 44 is illustrated in FIG. 3. Those skilled in the art will appreciate that other suitable indicia 44, including numbers or other symbols for example, could also be employed along with an appropriate scale, depending on the information being displayed and particular needs.

In one embodiment, display 30 includes color, shading, dot density, or another indicia 44 on front 46 of body 38 to qualitatively represent inventory levels in terms of countable units relative to comparison values, and includes color, shading, dot density, or other indicia 44 on top 48 of body 38 to qualitatively represent inventory levels in terms of time supply relative to comparison values. Although providing indicia 44 for both measures of inventory levels may be desired, the present invention contemplates system 10 providing color, shading, dot density, or other indicia 44 for both measures, only one measure (on front 46 or top 48 of body 38 as appropriate), or neither measure. Indicia 44 may be different for different measures. Where indicia 44 for only a single measure is desired, as illustrated in FIG. 2 the color, shading, dot density, or other indicia 44 may be the same on both front 46 and top 48 of body 38 at a certain time, as if body 38 was uniform in cross-section (in the plane of axes 34 and 36) at that time as to color, shading, dot density, or other indicia 44. Furthermore, even in the particular embodiment in which display 30 conveys inventory information, display 30 may have color, shading, dot density, or other indicia 44 on front 46, top 48, or both front 46 and top 48 of body 38 to convey inventory information other than the inventory levels that specify the shape of body 38. The present invention contemplates the use of indicia 44 to convey any appropriate information relating to the purposes for which display 30 is provided.

When display 30 is viewable in a three-dimensional environment in which the user can change his perspective in relation to display 30, the user can more readily focus on a selected measure of interest. For example, when display 30 is viewed generally from the front 46 of body 38, display 30 focuses the user's attention on inventory levels in terms of countable units. Alternatively, when display 30 is viewed generally from the top 48 of body 38, display 30 focuses the user's attention on inventory levels in terms of time supply. Thus, in this embodiment, display 30 allows users to examine inventory levels in terms of countable units individually, in terms of time supply individually, or in terms of both measures simultaneously. The present invention contemplates display 30 being viewable from any perspective to emphasize one measure relative to another measure to any suitable degree.

Figure 4:
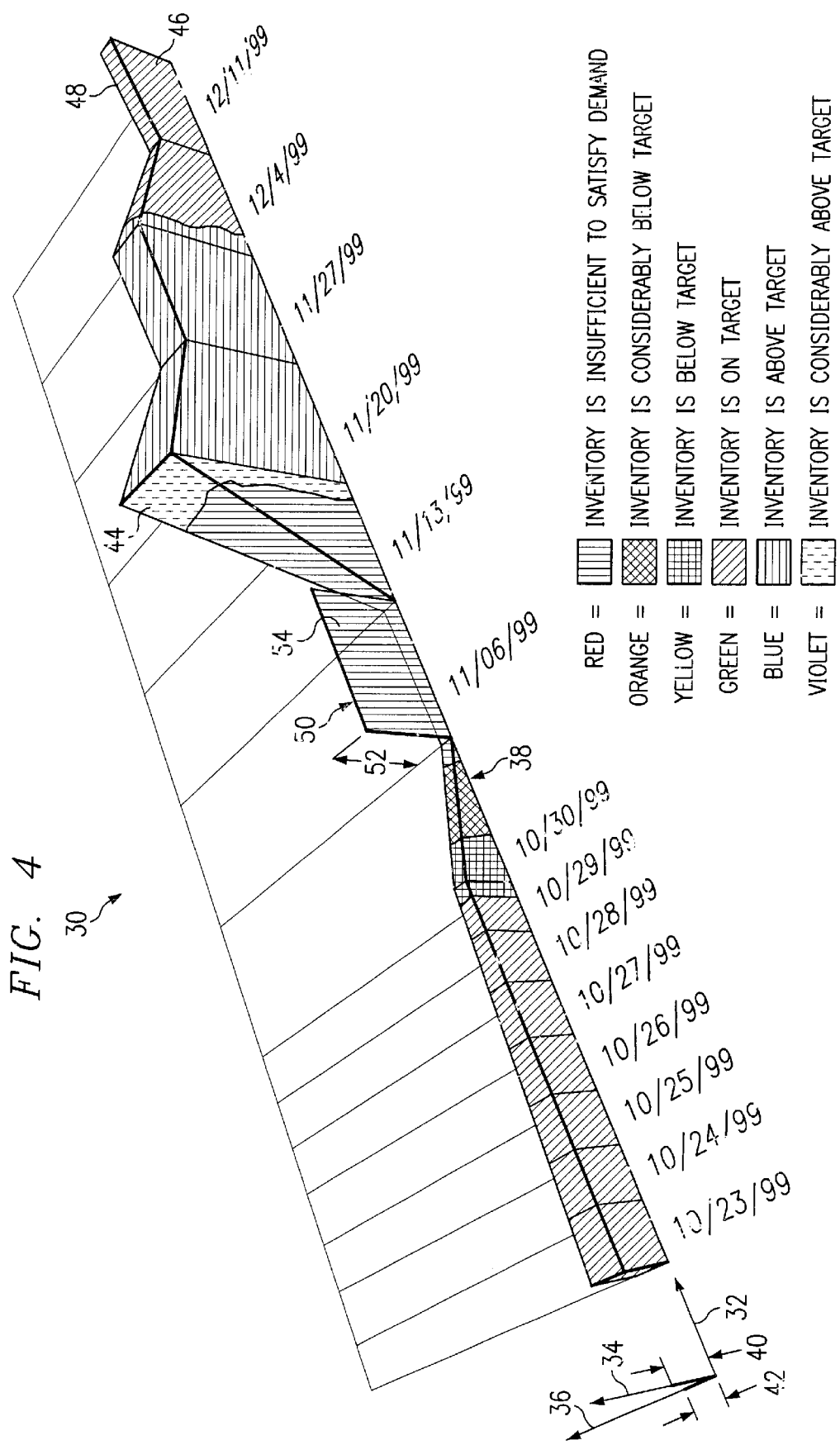
FIG. 4 illustrates an exemplary three-dimensional display of values relative to comparison values including a difference panel, with color as an indicia.

In one embodiment, as shown in FIG. 4, when a specified criteria has been met for a particular time or time interval, inventory insufficient to satisfy demand for example, system 10 generates a panel 50 indicating the additional amount of inventory needed to satisfy demand or otherwise match a specified comparison level. The height 52 of panel 50 equals or otherwise corresponds to the amount of demand in countable units that was not satisfied (inventory shortage) or was exceeded (inventory overage). Panel 50 may reflect an inventory shortage or overage of zero. Panel 50 may have any appropriate color, shading, dot density, or other indicia 54. For example only and not by way of limitation, panel 50 may have a color specified according to the color scale set forth above. If the criteria met was that inventory is "insufficient to satisfy demand," panel 50 might be red (according to the scale) as shown in FIG. 4 for the "11/6/99" time or time interval. If the criteria met was instead that inventory was "considerably below target," panel 50 might be orange (according to the scale) for that time or time interval. Moreover, if the criteria met was instead that inventory was "above target," panel 50 might be blue (according to the scale) for that time or time interval. Use of dot density as indicia 54 is illustrated in FIG. 5.

System 10 may generate multiple panels 50 for the same time or time interval, each corresponding to a different comparison level. For example, a first panel 50 may indicate the minimum additional inventory necessary to satisfy demand and a second panel 50 may indicate the additional inventory needed to reach some other specified target level. Panel 50 may substantially replace body 38 for the associated time or time interval, or may be positioned on top or otherwise cooperate with body 38 for that time or time interval. For example, to cooperate with body 38, one or more panels 50 may exist only in the vertical space (along axis 34) between body 38 and the corresponding target level heights. Although panel 50 associated with inventory levels in countable units is discussed, display 30 may include, instead or in addition, one or more panels associated with inventory levels in terms of time supply. In that case, the depth of the panel would equal or otherwise correspond to the inventory shortage or overage with respect to time supply.

Referring again to FIG. 2, display 30 also depicts the variation in measures of inventory levels (or any other appropriate information) over time, providing another important technical advantage. For example, 1000 countable units of inventory at one time might represent four days of time supply. At a different time, 1000 countable units might represent only two days of time supply. Thus, the portions of body 38 for those two times would have the same height (along axis 34) but different depths (along axis 36). Moreover, the portions of body 38 for those two times two might have different colors, indicting that the same 1000 countable units may have a different qualitative relationship to a target, benchmark, or other comparison level depending on the time or time interval concerned. As discussed above, body 38 and associated indicia 44 may transition smoothly or otherwise between two times to further reflect the time variation of the information being displayed.

Display 30 also depicts the interactions among the measures of inventory levels (or other appropriate information), providing yet another important technical advantage over previous systems. Because countable units, time supply, inventory shortages or overages, and the relationships of these measures to one or more comparison levels may not be correlated, the fact that body 38 is tall, deep, and green at one time, versus short, thin, and blue at another time, conveys information about the interactions between them that is not readily ascertainable from displays associated with previous systems. The shape of body 38, separate from or in cooperation with indicia 44, also provides a basis for evaluating the values that body 38 represents. For example only, and not by way of limitation, the expected or target shape of body 38 at a particular time or time interval might be tall and deep, with indicia 44 being green. If body 38 is instead short and thin, with indicia 44 being blue, display 30 allows a user to readily perceive the difference. These features contribute to the ability of system 10 to convey to users a larger quantity of information, on a single computer screen and in a visually compelling and readily comprehensible fashion, than would be feasible with previous systems.

According to the present invention, users of system 10 are provided inventory level information, through display 30, in a spatially efficient and readily interpretable manner. By viewing a single display 30, a user in a supply chain planning environment, or any other environment in which inventory information is pertinent, can readily achieve a comprehensive understanding of a past history, current situation, or future plan as it relates to inventory. As discussed above, however, the present invention is not limited to inventory information, as those skilled in the art will appreciate. System 10 may be used in a variety of manufacturing, transportation, supply chain, enterprise, or other planning environments, according to particular needs. Even more broadly, system 10 may be used in environments unrelated to planning. For example only and not by way of limitation, the present invention is equally applicable to physiological measures such as body height and body weight over time, weather measures such as temperature and precipitation over time, and other appropriate measures. Those skilled in the art will appreciate that the present invention encompasses all such scenarios.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented three dimensional display, comprising:

a graphical body conveying a first value corresponding to a value of a variable, the variable value being identified according to a axis, the first value being conveyed according to a height of the graphical body at the variable value;

the graphical body further conveying a second value also corresponding to the variable value, the second value being conveyed according to a depth of the graphical body at the variable value; and the graphical body further conveying at least a comparison of the first value to a first comparison value according to an indicia that is visible on the graphical body at the variable value, the indicia specified according to a predetermined scale;

the variable being time, the first value being a first inventory level either in terms of countable units or in terms of time supply, and the second value being a second inventory level either in terms of time supply, if the first inventory level is in terms of countable units, or in terms of countable units,if the first inventory level is in terms of time supply.

2. The display of claim 1, wherein the indicia is color.

3. The display of claim 2, wherein the color reflects the difference between the first value and the first comparison value at the variable value.

4. The display of claim 2, wherein the color is determined according to a qualitative assessment of the difference between the first value and the first comparison value at the variable value.

5. The display of claim 1, wherein the indicia is visible on a front of the graphical body.

6. The display of claim 1, wherein the graphical body further conveys a comparison of the second value to a second comparison value according to a second indicia visible on the graphical body at the variable value, the second indicia identified according to a second predetermined scale.

7. The display of claim 6, wherein:

the indicia is visible on a front of the graphical body; and the second indicia is visible on a top of the graphical body.

8. The display of claim 1, further comprising a panel associated with the graphical body at the variable value and conveying the difference between the first value and a target value at the variable value.

9. The display of claim 8, wherein:

the variable value is a time; and the panel conveys either an inventory shortage or an inventory overage at the time.

10. The display of claim 8, wherein the panel comprises a panel indicia visible on the panel at the variable value and corresponding to the difference between the first value and the target value according to a predetermined scale.

11. The display of claim 8, wherein the panel indicia is color.

12. The display of claim 1, wherein:

the graphical body further conveys an additional first value corresponding to an additional variable value also identified according to the axis, the additional first value being conveyed according to the height of the graphical body at the additional variable value;

the graphical body further conveys an additional second value corresponding to the additional variable value, the additional second value being conveyed according to the depth of the graphical body at the additional variable value; and the graphical body further conveys at least a comparison of the additional first value to the first comparison value according to the indicia at the additional variable value.

13. The display of claim 12, wherein:
the first value and the additional first value are first inventory levels in terms of countable units; and
the second value and the additional second value are second inventory levels in terms of time supply.

14. The display of claim 12, wherein the graphical body is substantially continuous between the variable value and the additional variable value.

15. The display of claim 14, wherein:
the indicia is color; and
the color transitions from a first color to a second color between the variable value and the additional variable value.

16. The display of claims 14, further comprising a panel associated with the graphical body that:
conveys the difference between the first value and a target value at the variable value;
further conveys the difference between the first value and the target value at the additional variable value; and
is substantially continuous between the variable value and the additional variable value.

17. The display of claim 1, wherein the display may be selectively viewed from a front of the graphical body to emphasize information associated with the first value and from a top of the graphical body to emphasize information associated with the second value.

18. A computer-implemented system providing a three-dimentional display, comprising:
at least one model of an environment;
at least one engine operable to generate a display using information associated with the model;
the display comprising:
a graphical body conveying a first value corresponding to a value of a variable, the variable value being identified according to an axis, the first value being conveyed according to a height of the graphical body at the variable value;
the graphical body conveying a second value also corresponding to the variable value, the second value being conveyed according to a depth of the graphical body at the variable value; and
the graphical body further conveying at least a comparison of the first value to a first comparison value according to an indicia that is visible on the graphical body at the variable value, the indicia specified according to a predetermined scale;
the variable being time, the first value being a first inventory level either in terms of countable units or in time supply, and the second value being a second inventory level either in terms of time supply, if the first inventory level is in of countable units, or in terms of countable units, if the inventory level is in terms of time supply.

19. The system of claim 18, wherein:
the environment is a supply chain planning environment; and
the engine is a planning engine.

20. The system of claim 18, wherein:
the environment is a supply chain planning environment; and
the engine is a planning engine.

21. The system of claim 18, wherein the indicia is color.

22. The system of claim 21, wherein the color reflects the difference between the first value and the first comparison value at the variable value.

23. The system of claim 21, wherein the color is determined according to a qualitative assessment of the difference between the first value and the first comparison value at the variable value.

24. The system of claim 18, wherein the indicia is visible on a front of the graphical body.

25. The system of claim 18, wherein the graphical body further conveys a comparison of the second value to a second comparison value according to a second indicia visible on the graphical body at the variable value, the second indicia identified according to a second predetermined scale.

26. The system of claim 25, wherein:
the indicia is visible on a front of the graphical body; and
the second indicia is visible on a top of the graphical body.

27. The system of claim 18, further comprising a panel associated with the graphical body at the variable value and conveying the difference between the first value and a target value at the variable value.

28. The system of claim 27, wherein:
the environment is a supply chain planning environment;
the engine is a planning engine;
the variable value is a time; and
the panel conveys either an inventory shortage or an inventory overage at the time.

29. The system of claim 27, wherein the panel comprises a panel indicia visible on the panel at the variable value and corresponding to the difference between the first value and the target value according to a predetermined scale.

30. The system of claim 27, wherein the panel indicia is color.

31. The system of claim 18, wherein:
the graphical body further conveys an additional first value corresponding to an additional variable value also identified according to the axis, the additional first value being conveyed according to the height of the graphical body at the additional variable value;
the graphical body further conveys an additional second value corresponding to the additional variable value, the additional second value being conveyed according to the depth of the graphical body at the additional variable value; and
the graphical body further conveys at least a comparison of the additional first value to the first comparison value according to the indicia at the additional variable value.

32. The system of claim 31, wherein:
the environment is a supply chain planning environment;
the engine is a planning engine;
the first value and the additional first value are first inventory levels in terms of countable units; and
the second value and the additional second value are second inventory levels in terms of time supply.

33. The system of claim 31, wherein the graphical body is substantially continuous between the variable value and the additional variable value.

34. The system of claim 33, wherein:
the indicia is color; and
the color transitions from a first color to a second color between the variable value and the additional variable value.

35. The system of claim 33, further comprising a panel associated with the graphical body that:
conveys the difference between the first value and a target value at the variable value;

further conveys the difference between the first value and the target value at the additional variable value; and is substantially continuous between the variable value and the additional variable value.

36. The system of claim 18, wherein the system is operable to allow the display to be selectively viewed from a front of the graphical body to emphasize information associated with the first value and from a top of the graphical body to emphasize information associated with the second value.

37. A computer-implemented method of displaying information using a three-dimensional display having a graphical body, the method comprising:

conveying a first value corresponding to a value of a variable, the variable value being identified according to an axis, the first value being conveyed according to a height of the graphical body at the variable value;

conveying a second value also corresponding to the variable value, the second value being conveyed according to the graphical body at the variable value; and conveying at least a comparison of the first value to a first comparison value according to an indicia that is visible on the graphical body at the variable value, the indicia specified according to a predetermined scale;

the variable being time, the first value being a first inventory level either in terms of countable units or in term of the time supply, and the second value being a second inventory level either in terms of time supply, if the first inventory level is in terms of countable units, or in terms of countable units, if the first inventory level is in terms of time supply.

38. The method of claim 37, wherein the indicia is color.

39. The method of claim 38, further comprising using the color to reflect the difference between the first value and the first comparison value at the variable value.

40. The method of claim 38, further comprising determining the color according to a qualitative assessment of the difference between the first value and the first comparison value at the variable value.

41. The method of claim 37, wherein the indicia is visible on a front of the graphical body.

42. The method of claim 37, further comprising conveying a comparison of the second value to a second comparison value according to a second indicia visible on the graphical body at the variable value, the second indicia identified according to a second predetermined scale.

43. The method of claim 42, wherein:

the indicia is visible on a front of the graphical body; and the second indicia is visible on a top of the graphical body.

44. The method of claim 37, further comprising associating a panel with the graphical body at the variable value to convey the difference between the first value and a target value at the variable value.

45. The method of claim 44, wherein:

the variable value is a time; and the panel conveys either an inventory shortage or an inventory overage at the time.

46. The method of claim 44, wherein the panel comprises a panel indicia visible on the panel at the variable value and corresponding to the difference between the first value and the target value according to a predetermined scale.

47. The method of claim 44, wherein the panel indicia is color.

48. The method of claim 37, further comprising:

conveying an additional first value corresponding to an additional variable value also identified according to the axis, the additional first value being conveyed according to the height of the graphical body at the additional variable value;

conveying an additional second value corresponding to the additional variable value, the additional second value being conveyed according to the depth of the graphical body at the additional variable value; and using the graphical body to convey at least a comparison of the additional first value to the first comparison value according to the indicia at the additional variable value.

49. The method of claim 48, wherein:

the first value and the additional first value are first inventory levels in terms of countable units; and the second value and the additional second value are second inventory levels in terms of the time supply.

50. The method of claim 48, wherein the graphical body is substantially continuous between the variable value and the additional variable value.

51. The method of claim 50, wherein:

the indicia is color; and further comprising transitioning the color from a first color to a second color between the variable value and the additional variable value.

52. The method of claim 50, further comprising associating a panel with the graphical body that:

conveys the difference between the first value and a target value at the variable value;

further conveys the difference between the first value and the target value at the additional variable value; and is substantially continuous between the variable value and the additional variable value.

53. The method of claim 37, further comprising allowing the display to be selectively viewed from a front of the graphical body to emphasize information associated with the first value and from a top of the graphical body to emphasize information associated with the second value.

* * * * *